United States Patent [19]

Naaktgeboren et al.

[11] Patent Number: 4,710,086

[45] Date of Patent: Dec. 1, 1987

[54] BALE ACCUMULATOR

[75] Inventors: Adrianus Naaktgeboren, Zedelgem; Roger H. Van Eecke, Blankenberge, both of Belgium

[73] Assignee: New Holland Inc., New Holland, Pa.

[21] Appl. No.: 834,098

[22] Filed: Feb. 26, 1986

[30] Foreign Application Priority Data

Feb. 27, 1985 [EP] European Pat. Off. ......... 85.200.268

[51] Int. Cl.⁴ ............................................ A01D 87/12
[52] U.S. Cl. ..................................... 414/44; 414/111; 414/473; 414/488; 414/549; 414/556; 414/558; 414/786
[58] Field of Search ..................... 414/24.5, 38, 39, 44, 414/111, 473, 488, 491, 549, 552, 556, 558, 786; 298/23 A, 23 B, 23 F; 56/473.5, 476, 480

[56] References Cited

U.S. PATENT DOCUMENTS

| | | | |
|---|---|---|---|
| 3,123,239 | 3/1964 | Shoemake et al. | 414/488 X |
| 3,599,810 | 8/1971 | Wanko | 414/558 |
| 3,938,432 | 2/1976 | Jones | 414/44 X |
| 4,215,964 | 8/1980 | Schrag et al. | 414/111 |
| 4,310,275 | 1/1982 | Hoelscher | 414/111 |

FOREIGN PATENT DOCUMENTS 2305929 8/1973 Fed. Rep. of Germany ........ 414/44

Primary Examiner—Leslie J. Paperner
Attorney, Agent, or Firm—Darrell F. Marquette; Frank A. Seemar; Larry W. Miller

[57] ABSTRACT

A bale accumulator is provided for use in conjunction with a baler from which, during operation, bales successively are discharged. The accumulator comprises a bale receiving table movable between a home position for receiving a bale from the baler and a bale transfer position. A loadbed is disposed to receive bales from the bale receiving table and to accumulate a plurality of bales thereon. The bale receiving table is pivotally mounted on a shuttle mechanism which itself is movable along a transverse linear path between retracted and extended positions. When the bale receiving table is in its home position, it is located in a lower position with the shuttle mechanism assuming its retracted position. In this condition the bale receiving table is disposed at least partially vertically underneath the loadbed. Positioning means are provided for moving the receiving table from its home position underneath the loadbed to its bale transfer position generally alongside and at the level of the loadbed. The positioning means are operable, when moving the bale receiving table to the bale transfer position, to simultaneously pivot the bale receiving table upwardly around its pivotal mounting on the shuttle mechanism and to translate the shuttle mechanism with the receiving table thereon from its retracted position to its extended position. The arrangement is such that the bale receiving table is moved through a composite path of elongated and curved shape.

13 Claims, 9 Drawing Figures

BALE ACCUMULATOR

BACKGROUND OF THE INVENTION

This invention relates to a trailer that attaches to the rear of a mobile crop baler for the purpose of grouping side-by-side several bales as they issue from the baler and of dumping accumulated bales as a unit on the ground in a suitable position for later to be picked up by a clamp apparatus and deposited as a unit on a vehicle for hauling to another location. The bale accumulator and discharger of the present invention is particularly well-suited for use in conjunction with so-called medium-size square balers capable of producing bales of hay in the order of 300 kg. This type of baler is disclosed in U.S. Pat. No. 4,525,991. The present invention is not limited to medium-size square balers of that type, but may, in fact, be utilized with great effectiveness in conjunction as well with so-called large square balers such as shown in U.S. Pat. No. 4,034,543 producing hay bales of up to one ton each and with small, conventional square balers.

An agricultural baler is a widely used piece of equipment which collects and compresses crop material such as hay, straw etc., whereafter wire or twine is applied around the compressed material to hold a bale together. Formed bales are ejected periodically from a bale chamber of the baler as the latter travels over the ground, and each bale on being ejected normally then drops to the ground.

In order to make a farming operation more efficient, it has already been proposed to provide a machine for trailing attachment to a conventional agricultural baler to receive successive bales as they are discharged from the baler, to accumulate the bales in a group, and to discharge the grouped bales on the ground.

It is also known to provide such a machine with means for automatically accumulating the bales in a predetermined group and automatically discharging the bales when the predetermined group is formed. Such a machine is shown in U.S. Pat. No. 3,272,352, wherein the bales are accumulated standing on their ends in a side-by-side relationship and automatically discharged when a predetermined group has accumulated by utilizing the weight of the bales to tilt the floor of the machine, so that the bales slide off in successive rows as the machine advances and are deposited, shingle fashion, on the ground. However, the manner in which the bales are deposited on the ground makes later collection of the grouped bales as a unit by mechanical means, such as a forklift, difficult, if not impossible.

The aformentioned accumulator is used in conjunction with a conventional baler producing small rectangular bales and having a bale chamber generally at one side of the machine. The loadbed upon which bales are accumulated, is disposed in offset relationship to one side of the bale chamber and yet this accumulator has a width extending beyond both opposite sides of the baler as seen in fore-and-aft direction.

A similar bale accumulator for use in conjunction with a conventional baler having a bale case generally at one side of the machine, is shown in U.S. Pat. No. 4,310,275. In operation, bales are received in pairs on a bale receiving table which is generally aligned with the bale case and which is pivotable to a bale transfer position to place successive bales on a loadbed which again is disposed in generally offset relationship to one side of the bale case.

In the arrangements according to U.S. Pat. Nos. 3,272,352 and 4,310,275, the given width of the implement is not efficiently used for accumulating the maximum number of bales. Indeed, a substantial section of the transverse width of the accumulator is taken by the bale receiving and transfer means and which consequently cannot be used for holding accumulated bales.

U.S. Pat. No. 4,215,964 shows a bale accumulator for use in conjunction with a so-called large rectangular baler having a generally centrally disposed bale case as seen in transverse direction of the machine.

The bale accumulator, in operation, is coupled to the rear of the baler with a central bale receiving table generally aligned with the bale case and with bale holding platforms at both sides of the bale receiving table. Bale transfer means are associated with the receiving table and are operable successively to transfer one bale from the receiving table to one side platform and a next bale from said receiving table to the opposite side platform. These side platforms are pivotable to dump the pair of bales collected thereon onto the ground while that a third bale inches its way onto the centrally disposed bale receiving table. It thus will be understood from what precedes that the arrangement according to U.S. Pat. No. 4,215,964 cannot group several bales side-by-side and dump such bales as an accumulated unit on the ground in a suitable position for later to be picked up as such by a clamp apparatus.

It is an object of the present invention to provide a bale accumulator and discharger of a width not exceeding the 3.0 meter limit, that attaches to the rear of a mobile baler in general alignment therewith and that accumulates a maximum number of bales in side-by-side relation transversely of the implement for subsequent dumping as a unit onto the ground.

SUMMARY OF THE INVENTION

According to the invention a bale accumulator is provided for use in conjunction with a baler from which, during operation, bales successively are discharged. The bale accumulator comprises a bale receiving table movable between a home position for receiving a bale from the baler and a bale transfer position, a loadbed disposed to receive bales from the bale receiving table and to accumulate a plurality of bales thereon, and positioning means for moving the bale receiving table from its home position to its bale transfer position, and vice versa.

The bale accumulator according to the invention is novel in that, when in its home position, the bale receiving table is disposed at least partially vertically underneath the loadbed, and the positioning means is operable to move the receiving table from underneath the loadbed to its bale transfer position generally alongside and at the level of the loadbed.

Preferably the bale receiving table is pivotally mounted on a shuttle mechanism which itself is movable along a transverse linear path between retracted and extended positions. The shuttle mechanism assumes its retracted position and the bale receiving table assumes a lower position when the latter is located in its home position. The positioning means, when moving the bale receiving table to the bale transfer position, are operable to simultaneously pivot the bale receiving table upwardly around its pivotal mounting on the shuttle mechanism and to translate the shuttle mechanism with the bale receiving table thereon from its retracted position to its extended position, the arrangement being such that the bale receiving table is moved through a composite path of elongated and curved shape.

The invention also provides a method for accumulating bales as they successively are discharged from a baler during a baling operation and for dumping accumulated bales as a unit on the ground. A bale accumulator is used having a bale receiving table and a loadbed. The method comprises the steps of receiving a bale from the baler on the bale receiving table, transferring the bale received on the bale receiving table from the latter onto the loadbed, repeating the receiving and transferring steps, until a plurality of bales is accumulated on the loadbed, and dumping the bales accumulated on the loadbed in a rearward direction as a unit onto the ground.

The method is novel in that during the receiving steps, the bale receiving table is positioned at least partially vertically underneath the loadbed. The bale transferring step comprises the further steps of (a) moving the bale receiving table with the bale thereon from its home position underneath the loadbed through a composite path to a bale transfer position alongside and generally at the level of the loadbed; the composite path being obtained by a simultaneous pivoting movement of the bale receiving table around a pivot and a linear translating movement of the pivot together with the bale receiving table in a direction away from underneath the loadbed, (b) subsequently translating the bale receiving table with the bale thereon in the opposite direction along a linear path for actually transferring the bale from the bale receiving table onto the loadbed, and (c) finally pivoting the bale receiving table without the bale back to its home position at least partially vertically beneath the loadbed.

DESCRIPTION OF THE INVENTION

In the following description, right hand and left hand references are determined by standing at the rear of the machine and facing in a direction of forward travel. Also, in the following description, it is to be understood that such terms as "forward", "rearward", "left", "right", "upwardly", etc. are words of convenience and are not to be construed as limiting terms.

Figure 1:
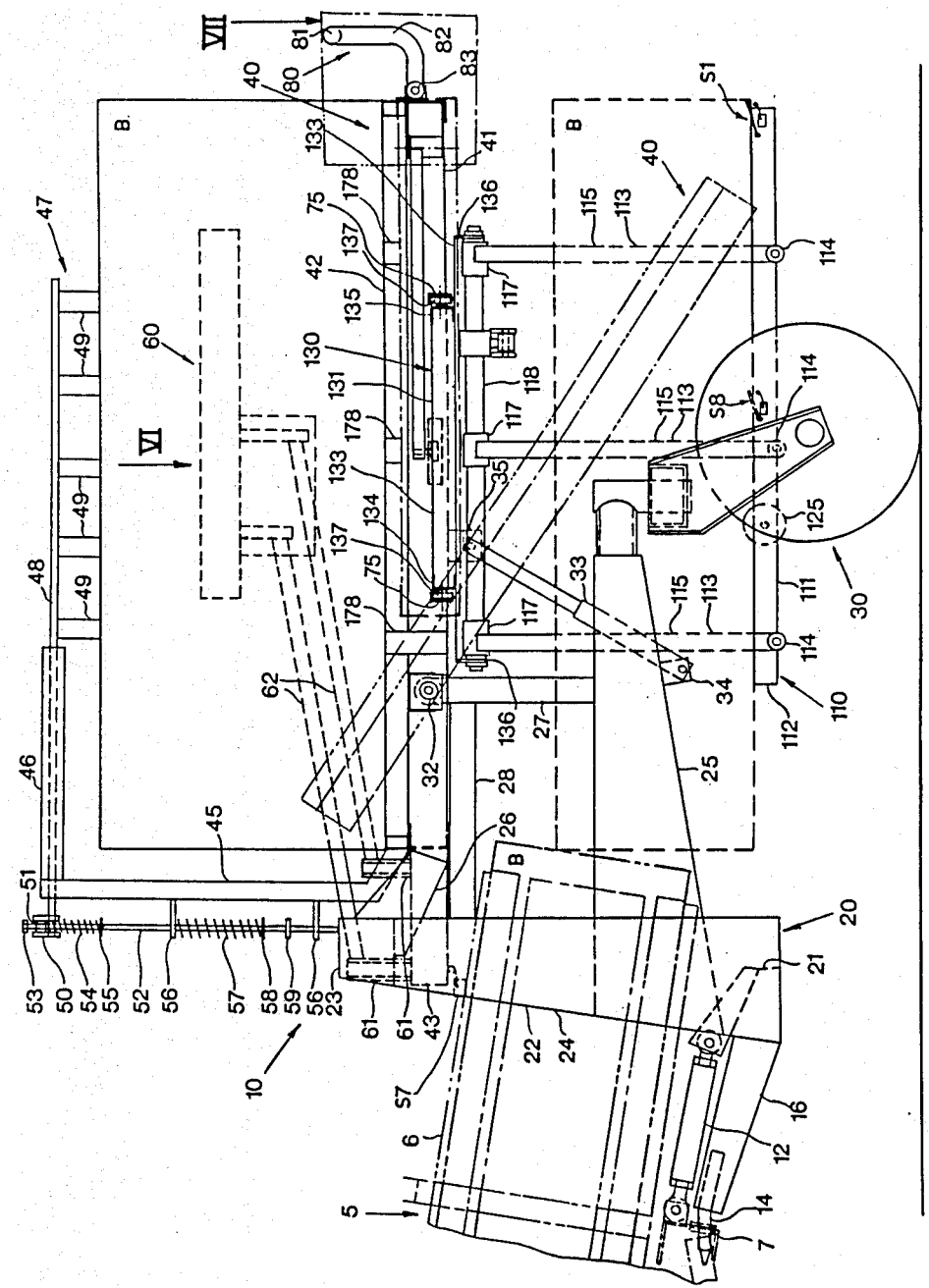
FIG. 1 is a schematic side elevational view of a bale accumulator embodying the present invention and with portions being broken away to more clearly show the operational components thereof.

With reference to FIG. 1, the bale accumulator 10 is shown attached to the rear end of a baler 5 having a bale case 6 and other components mounted on a frame 7. Only the rear end of the bale case 6 and a small portion of the baler frame 7 are shown in FIG. 1. The baler 5 preferably is a so-called medium size square baler operable to produce hay bales in the range of 300 kg each and having a generally centrally disposed bale case as seen in transverse direction. Such a baler normally has a transverse pick-up means disposed beneath the forward end of the bale case. Usually the bale case is inclined downwardly from front to rear and has an outlet which is positioned fairly close to the ground. A baler of this type is shown in U.S. Pat. No. 4,525,991.

A pair of universal links 12 (of which only one is shown in the drawings) on opposite sides of the bale case 6 connect the accumulator 10 to the baler frame 7 so that the assembly thus formed can articulate about a transverse horizontal axis in response to changes in the ground contour. A central fore-and-aft extending tongue 16, rigidly fixed to the accumulator 10, is pivotally connected by means of its forward mounting pin 14 to the baler frame 7 to aid in the interconnection of the two implements. The mounting pin 14 is received in an appropriate aperture in a member of the baler frame 7 in a manner to transfer the downward load on the accumulator tongue 16 to the baler 5 while permitting the accumulator 10 to articulate about the axis of the mounting pin 14 up to a limited degree in response to variations in the ground contour.

According to a desirable aspect of the present invention, the accumulator 10 is connected generally centrally behind the baler, which itself preferably is a so-called in-line baler; i.e. a baler which, in operation, is pulled centrally behind the tractor as opposed to being in offset relationship therewith. While the baler 5 usually has a width in the range of 2.5 meters; the accumulator 10 preferably has a width of up to, but not exceeding 3 meters. The accumulator thus has opposite sides extending only slightly beyond the opposite sides of the baler over equal distances of about 25 centimeters. In practice, this means that the implement train is a generally in-line train (tractor, baler, accumulator), which greatly improves the maneuverability and which reduces the risks for any component to interfere with adjacent crop windrows.

The accumulator 10 has a rigid frame 20 that includes a main transverse beam 21 which is part of a forward rectangularly shaped and generally upright frame section 22 also comprising a top transverse beam 23 and opposed, generallly upright side beams 24. The rectangular frame section 22 extends generally around the bale case 6 at a location slightly forwardly of the discharge end thereof when the accumulator is coupled to a baler 5 for operation in unison therewith. The universal links 12 and the tongue 16 both are coupled to the main transverse beam 21. A pair of laterally outboard fore-and-aft extending beams 25 (only one being visible in FIG. 1) extend rearwardly from the upright side beams 24 and together with the rectangular frame section 22 generally form a U-shape, when seen in top view. This U-shape has its open end facing rearwardly and castor wheel assemblies 30 of the type as generally known in the art, are attached to the free ends of the beams 25. The castor wheel assemblies 30 are provided either generally at the middle of the accumulator 10, as seen in the fore-and-aft direction, or slightly further to the rear thereof, so that the load on the tongue 16 and its mounting pin 14 is kept at an acceptable level.

A load platform or loadbed 40 is pivotally mounted on the frame 20 around a horizontally extending transverse pivot 32. A first frame member 26 is rigidly connected to the upper transverse beam 23 intermediate its ends and extends in a rearward direction alongside the left hand side of the load platform 40. A further frame member 27 extends vertically upwardly from the right hand side fore-and-aft beam 25 and generally adjacent the right hand side of the accumulator 10. A reinforcement beam 28 couples the upright frame member 27 at the right hand side upright side beam 24 of the rectangular frame section 22. Both frame members 26, 27 have their free ends transversely and horizontally aligned with each other for pivotally supporting said load platform 40 thereat.

It is remarked that the load platform pivot 32 is situated forwardly of the middle of the length of the load platform 40 in a manner so that the latter always has the tendency to tip downwardly in a rearward direction. Loadbed positioning means in the form of a hydraulic loadbed cylinder 33 extend between a lug 34 on the right hand side fore-and-aft beam 25 of the frame 20 and a lug 35 on the underside of the load platform 40 and hold the latter in the generally horizontal home position shown in full lines in FIG. 1, when extended, and permit the load platform 40 to tip downwardly around the pivot 32 toward the inclined discharge or bale dumping position shown in dotted lines in FIG. 1, when the cylinder 33 is permitted to retract.

The load platform or loadbed 40 is formed by a subframe 41 made of U-profiles which are welded together in a generally rectangular shape and which have further reinforcing U-profiles intermediate its opposite sides. An actual load support surface 42 is provided on top of said subframe 41. The subframe 41 is extended at the forward right hand corner of the loadbed 40 in a forward direction and alongside the right hand side of the rectangular frame section 22 for supporting at this location 43 a pair of spaced apart pivots 61 of a bale holding mechanism 60 to be described in more details hereafter. When in its home position, the load platform 40 is positioned generally horizontally at a level above and just rearwardly of the outlet of the bale case 6 of the baler 5. While the bale accumulator 10 generally is centered rearwardly of the baler 6, it will be noticed from FIG. 2 that the loadbed 40 is positioned somewhat offset to the right. The receiving end 44 of the loadbed is positioned generally vertically above the center of the bale case 6 as seen in the rear view of FIG. 2.

An upright support 45 is secured to the loadbed 40 at the forward left hand side corner thereof and supports at its upper end a generally fore-and-aft extending bushing 46 for rotatably receiving the pivot shaft 48 of a bale retainer mechanism 47 which is of a type generally known in the art. This bale retainer mechanism 47 comprises a plurality of leaf spring type bale retainer members 49 secured to the pivot shaft 48 and which extend downwardly at an inclination to the right of the accumulator and which are positioned generally above the bale receiving end 44 of the loadbed 40.

A crank arm 50 is secured to the forward end of the pivot shaft 48 and extends in a direction generally opposite to the orientation of the bale retainer members 49.

The crank arm 50 pivotally supports an apertured abutment 51 at its other end. An upright rod 52 extends through the aperture thereof and has a stop 53 at its upper end and above the abutment 51. A coil spring 54 extends coaxially with the rod 52 beneath the apertured abutment 51 and abuts the latter as well as a further stop 55 on the rod 52. When, during operation, the bale retainer members 49 are urged upwardly around the pivot shaft 48, the crank arm 50 and the apertured abutment 51 are pivoted downwardly compressing the coil spring 54, whereby the crank arm 50 thus is movable relative to the rod 52. The coil spring 54 urges the bale retainer members 49 downwardly in a direction toward the loadbed 40.

The rod 52 is guided through apertures provided in a pair of supports 56 welded to the upright support 45. A further coil spring 57 extends coaxially with the rod 52 and in abutting engagement with the upper support 56 at one end and a further stop 58 on the rod 52 on the other end. This coil spring 57 is arranged to urge the rod 52 downwardly, whereby, when rod 52 is allowed to move downwardly, the bale retainer members 49 are pivoted upwardly accordingly. When operative, the further coil spring 57 moves the rod 52 downwardly and correspondingly the bale retainer members 49 upwardly until still a further stop 59 abuts against the lower support 56. When the load platform 40 is in its horizontal home position, the rod 52 abuts with its lower end on the top transverse beam 23 of the frame 20 thus compressing the lower coil spring 57 and enabling the upper coil spring 54 to operate and urge the bale retainer members 49 downwardly.

Turning back to the bale holding mechanism 60 which is equally supported on the loadbed 40, this structure now will be described in more details with particular reference to FIG. 6. This bale holding mechanism 60 basically consists of a deformable parallelogram linkage having a pair of bent arms 62 which are pivotally supported at one end on the pivot shaft 61 for movement in a plane parallel to and above the loadbed 40. Adjacent the bends therein, a lug 63 is provided on each arm 62 and a link 64 is pivotally attached at its opposite ends to the lugs 63. This link 64 forms the third side of the parallelogram structure. The fourth side thereof is formed by a bale holding member 65 in the form of a plate which is pivotally attached to the other ends of the arms 62.

Figure 6:
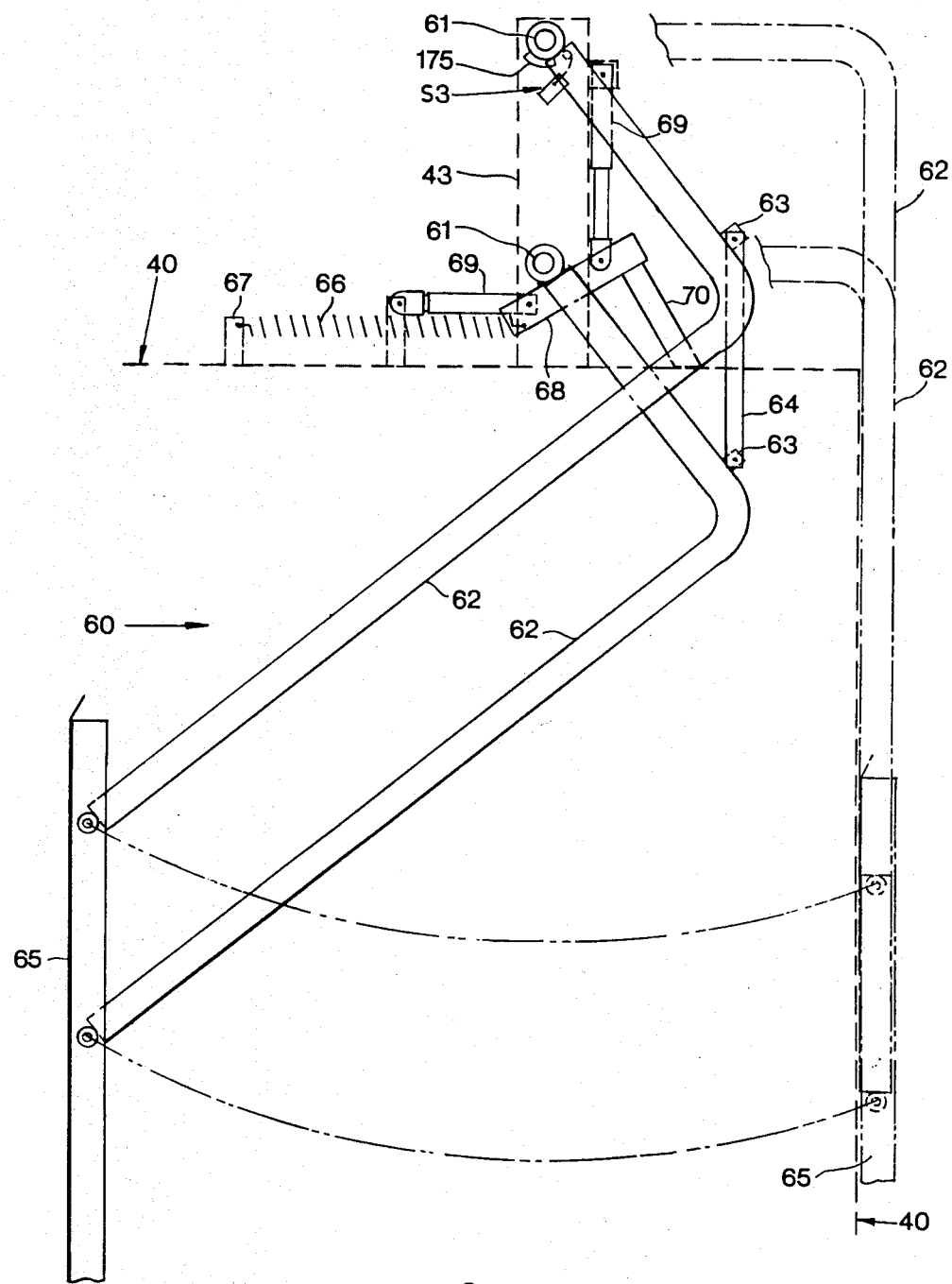
FIG. 6 is an enlarged fragmentary view taken in the direction of arrow VI in FIG. 1 and again only showing some components of the machine according to the invention.

A coil spring 66 extends between a fixed lug 67 on the load bed 40 and a support member 68 welded to one of the pivot arms 62 adjacent its pivot shaft 61 and is arranged in tension to urge the parallelogram linkage toward the position shown in full lines in FIG. 6, which is the position in which the bale holding member 65 is located proximate to and above the bale receiving end 44 of the loadbed 40. The member 65 is movable parallel from its initial position against the force of coil spring 66 toward a position proximate to and above the right hand side edge of the loadbed 40, which is shown in phantom in FIG. 6.

A pair of hydraulic damping cylinders 69 are coupled between the loadbed 40 and the parallelogram linkage in a manner to eliminate undesirable movements of the linkage that may be induced to the bale holding mechanism 60 by shocks and vibrations resulting from operation on uneven terrain. A stop 70 is welded to the member 68 and is arranged to abut against the load platform 40 for restricting the movement of the bale holding member 65 in the direction toward its full line position adjacent the receiving end 44 of the loadbed 40.

Also pivotally mounted on the loadbed 40 are gate means in the form of a tailgate 80 which comprises a transverse retainer rod 81 having bent support legs 82 adjacent its opposite ends which, in turn, are secured to a pivot shaft 83. In its home position, the retainer rod 81 is positioned above the level of the load surface 42 and generally parallel to and slightly rearwardly of the rear edge of said load surface 42. The tailgate 80 may be urged to a retracted position beneath the level of the load surface 42 during unloading of accumulated bales. This position is schematically shown in dotted lines in FIG. 7.

Figure 7:
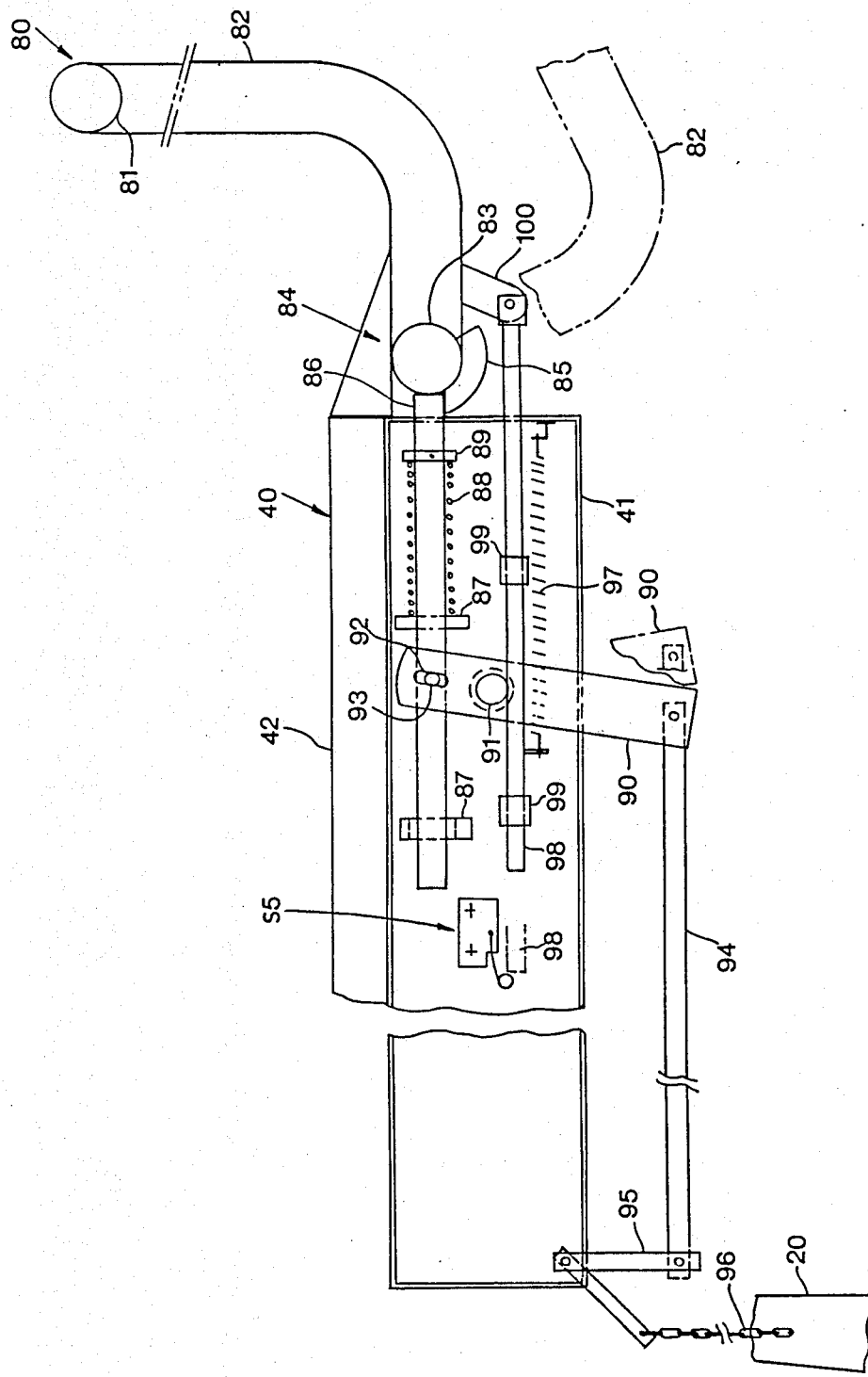
FIG. 7 is an enlarged fragmentary view of the components indicated at VII in FIG. 1.

With particular reference to FIG. 7, gate holding means in the form of a latch mechanism 84 for the tailgate 80 will now be described in more details. A cam 85 is welded to the pivot shaft 83. A latching pin 86 is slidably supported underneath the load surface 42 by means of spaced apart apertured lugs 87. Pin 86 extends through a hole in the rear beam of the loadbed 40. A coil spring 88 extends coaxially with the latching pin 86 and abuts at one end against one of the lugs 87 and at its other end against a stop 89 on the latching pin 86. The coil spring 86 urges the latching pin 86 toward its latching position whereby it snaps behind the cam 85 when the tailgate 80 is in its home position, as shown in FIG. 7. The latching pin 86 thus is operable to hold the tailgate 80 in its raised home position even when a load is applied thereagainst which would tend otherwise to swing the tailgate 80 downwardly.

A pivot lever 90 is pivotally mounted intermediate its ends at 91 on the load platform 40 underneath the load surface 42 thereof and has an elongated slot 92 adjacent one end for receiving a pin 93 secured to the latching pin 86. The other end of the lever 90 is pivotally coupled to one end of a fore-and-aft extending rod 94 which itself is pivotally coupled at its other end to a crank 95 which in turn is pivotally mounted on the loadbed 40 adjacent the forward end thereof and beneath the load surface 42. A chain 96 is coupled to the other end of the crank 95 on the one hand and to a fixed part of the frame 20 on the other hand. As the load bed 40 is tipped from its home position to an inclined discharge position, the chain 96 is first tensioned, whereafter further pivoting movement of the loadbed 40 results in the chain 96 pulling on the crank 95 thus causing the lever 90 to pivot around pivot 91 from its full line position to its dotted line position shown in FIG. 7. This causes the latching pin 86 to retract, thus releasing the tailgate 80 and allowing the latter to pivot downwardly when a certain load is exerted thereagainst.

This downward pivoting movement of the tailgate 80 toward the retracted position is opposed by a tension spring 97 acting between the underside of the loadbed 40 and a lifting rod 98 guided through apertured lugs 99 on the loadbed 40. This lifting rod 98 is pivotally coupled to a lug 100 on one of the support legs 82. The tension spring 97 is sufficiently strong to move the lifting rod 98 rearwardly thus causing the tailgate 80 to move to its home position when no load is supported thereagainst.

Another essential component of the accumulator 10 is formed by the bale receiving and bale transfer table 110 (briefly called hereafter bale lift), which is pivotally mounted on a shuttle mechanism 130 which itself is operatively supported on the underside of the loadbed 40. The bale lift 110 is movable, as will be described hereafter in more details, between a lower bale receiving position generally rearwardly of the outlet of the bale case 6 and vertically underneath the bale receiving end 44 of the loadbed 40, and a raised bale transfer position generally at the level of and to the left hand side of the loadbed 40.

The bale lift 110 comprises a receiving table 111 basically formed of two spaced apart and generally fore-and-aft extending elongate members 112 which, in the bale receiving position of the table 111 are positioned generally rearwardly of the underside of the bale case outlet and at a level slightly therebelow and in fore-and-aft alignment therewith. The elongate members 112 thus present a bale receiving surface for receiving a bale thereon as it issues from the baler 5. As can be taken from FIG. 1, the forward edge of the receiving table 111 is spaced at a certain distance rearwardly of the bale case outlet.

Figure 2:
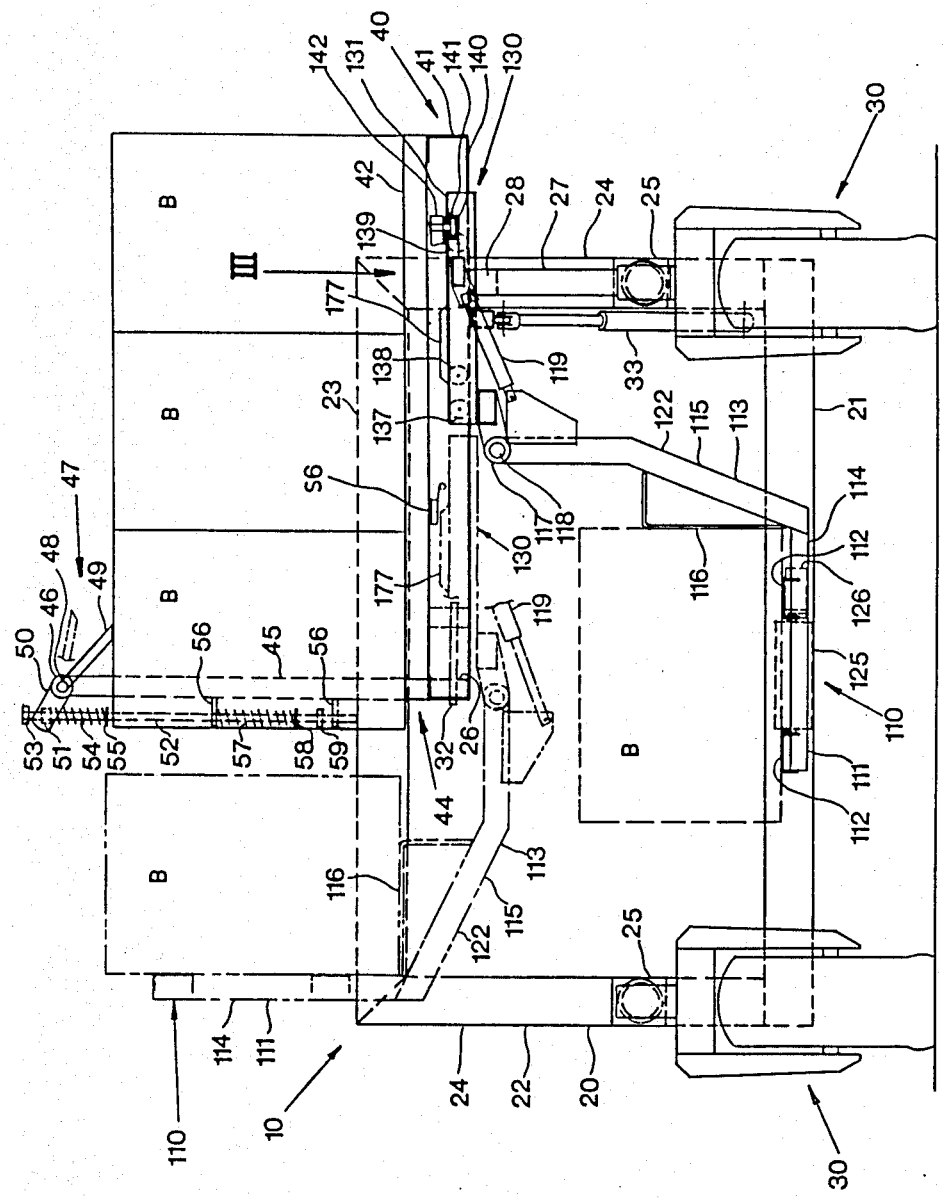
FIG. 2 is a rear view of the machine shown in FIG. 1 with certain components omitted for the sake of clarity.

The elongate members 112 are secured to three angled supports 113 which, in the bale receiving position of the table 111 have lower generally transversely extending horizontal legs 114 and upper generally upright legs 115. These upright legs 115 have a somewhat bent shape with the lower sections 122 inclined at an angle of more than 90° to the elongate members 112 and, as best seen in FIG. 2, to which bale support means in the form of support plates 116 are secured which extend at right angles to elongate members 112 as seen in cross section.

Figure 4:
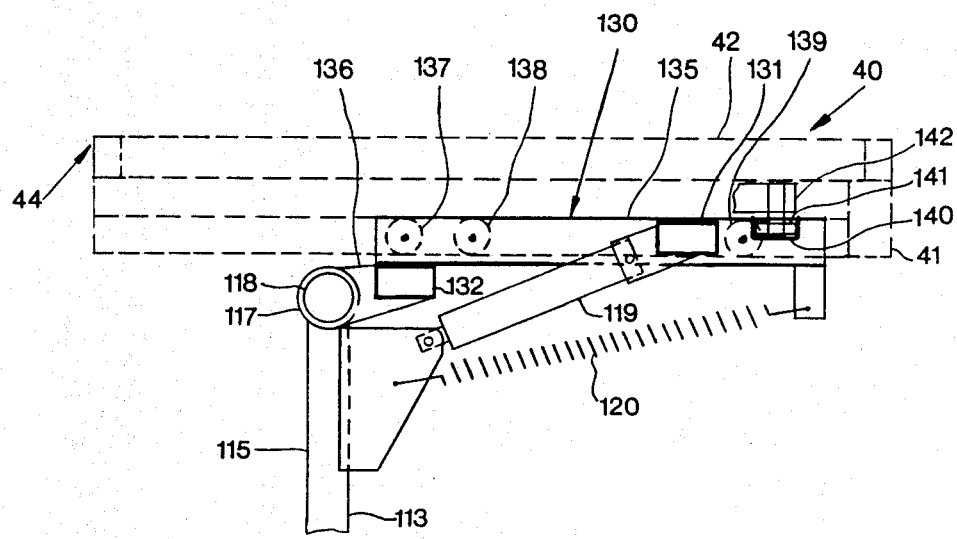
FIGS. 4 and 5 are enlarged fragmentary views taken in the direction of arrow IV in FIG. 3 and only showing some components of the machine according to the invention.

The upright legs 115 are secured to bushings 117 which in turn are affixed to a shaft 118 which itself is pivotally mounted on the shuttle mechanism 130. A single acting hydraulic table cylinder 119, which is part of the bale receiving table positioning means, extends between the shuttle mechanism 130 and one of the upright legs 115 and is operable to pivot the bale lift 110 upwardly to the bale transfer position when energized to extend. As shown in FIG. 4, a tension spring 120 is provided between the shuttle mechanism 130 and the bale lift 110 and is arranged to urge the bale lift 110 towards its bale receiving position.

A conveyor means in the form of a bale transfer roller 125 having a corrugated surface may be mounted rotatably between the members 112 of the receiving table 111 and in the forward half thereof. A hydraulic motor 126 is coupled to this roller 125 for energizing the latter.

Turning now to the shuttle mechanism 130, this structure will be described in more details with reference to FIGS. 1-5. The shuttle 130 comprises a generally rectangular subframe 131 formed by fore-and-aft beams 132 and 133 respectively and transverse beams 134 and 135. The 132 supports at its outer ends lugs 136 for pivotally carrying the pivot shaft 118, which itself supports the bale lift 110. The transverse beams 134,135 each have a pair of rollers 137,138 adjacent their end which is closest to the bale lift 110 and a further roller 139 adjacent the other end. These rollers 137, 138, 139 are arranged to ride in U-shaped channel members 75 of the loadbed 40, whereby the shuttle mechanism 130 with the bale lift 110 mounted thereon can move transversely of the accumulator 10 between opposite extreme positions.

Figure 3:
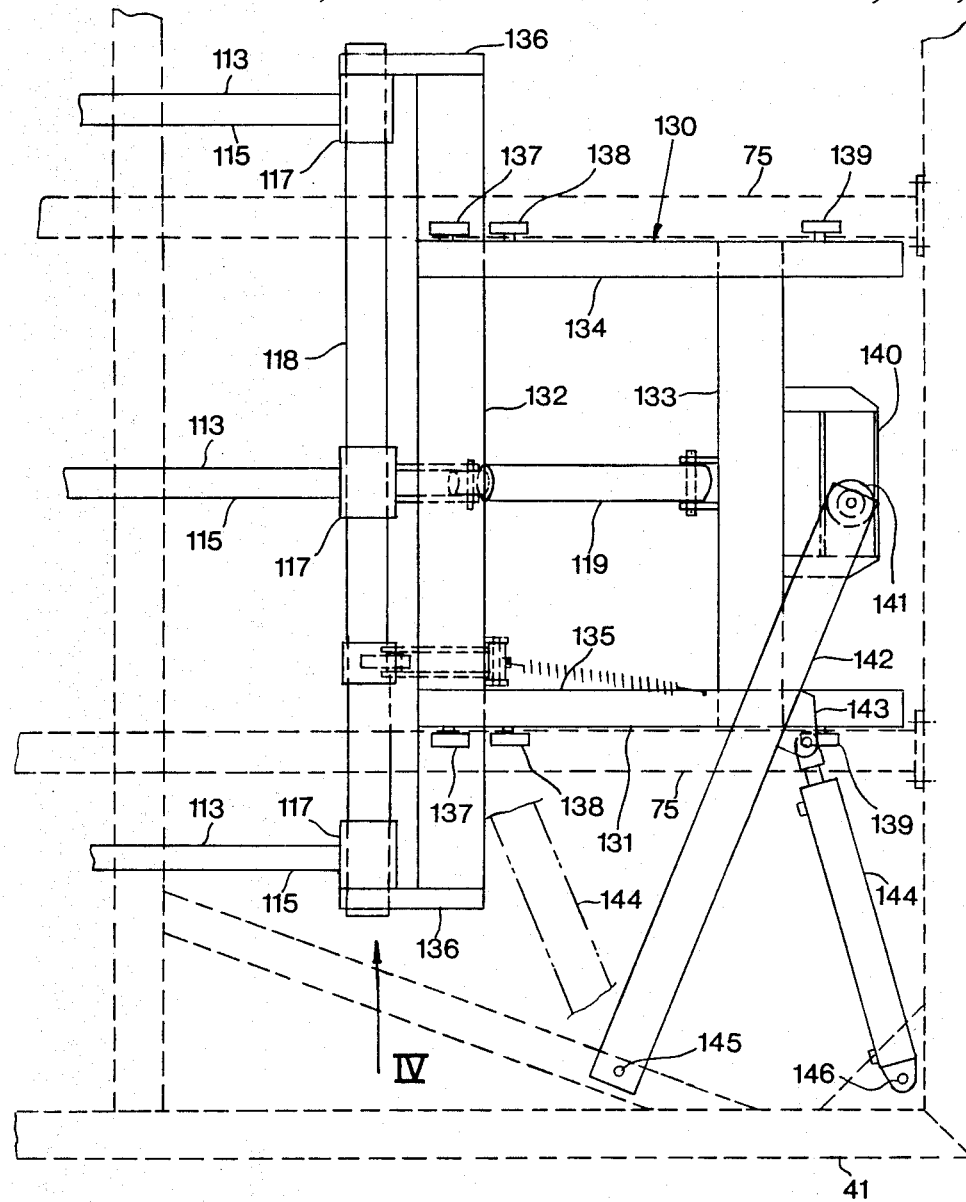
FIG. 3 is an enlarged fragmentary view taken in the direction of arrow III in FIG. 2 showing a shuttle mechanism which is part of the structure according to the invention.

A further U-shaped channel member 140 is secured to the beam 133 of the shuttle subframe 131 and is arranged to operatively receive a further roller 141 which itself is rotatably mounted on one end of an actuator arm 142. This arm 142 is pivotally mounted at its other end 145 on the underside of the loadbed 40 and is pivotally connected intermediate its ends at lug 143 to a double acting cylinder 144, which in turn is pivotally supported at 146 on the underside of the loadbed 40. The cylinder 144 also is part of the bale receiving table positioning means. Extension of the cylinder 144 causes the actuator arm 142 to pivot from its full line position to its dotted line position as shown in FIG. 3, whereby the shuttle mechanism 130 and the bale lift 110 thereon are moved from their extreme right position to their extreme left position.

Figure 5:
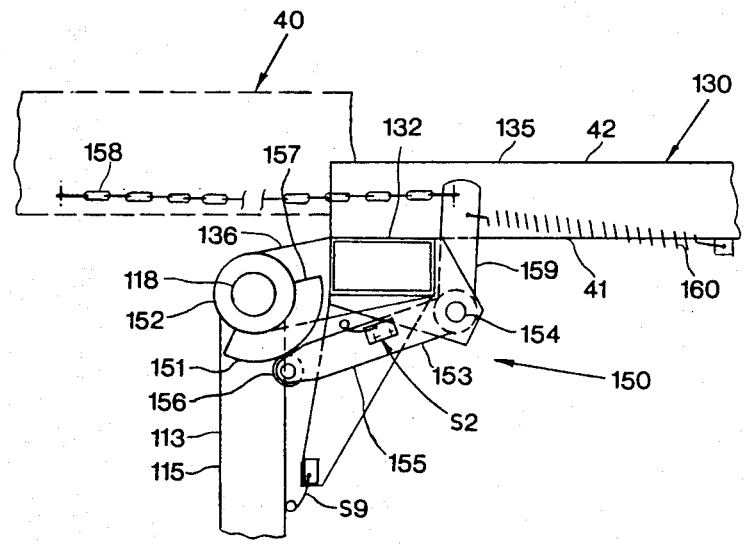

With particular reference to FIG. 5 a bale lift latching means 150 will now be described in more details. A cam 151 is secured to the pivot shaft 118 via a further bushing 152. A latching crank 153 is pivotally mounted at 154 on the beam 132 of the shuttle subframe 131 and carries at one end of its arm 155 a roller 156 which is disposed for rolling contact with the surface of cam 151 and which may snap behind the cam end 157 as the bale lift 110 is pivoted to its bale transfer position. A chain 158 is coupled to the free end of the other crank arm 159 and is further also coupled to a fixed portion of the loadbed 40. The arrangement is such that the chain 158 retracts the roller 156 from its latching position behind the cam end 157 as the shuttle 130 is moved to its extreme right position. A tension spring 160 extends between the crank arm 159 and a fixed portion of the shuttle 130 in a manner to urge the latching crank 153 with the latching roller 156 thereon toward the latching position. The bale lift latch 150 thus is operable to mechanically lock the bale lift 110 in its raised position unless the shuttle 130 with the bale lift 110 thereon assumes its extreme right position.

Figure 8:
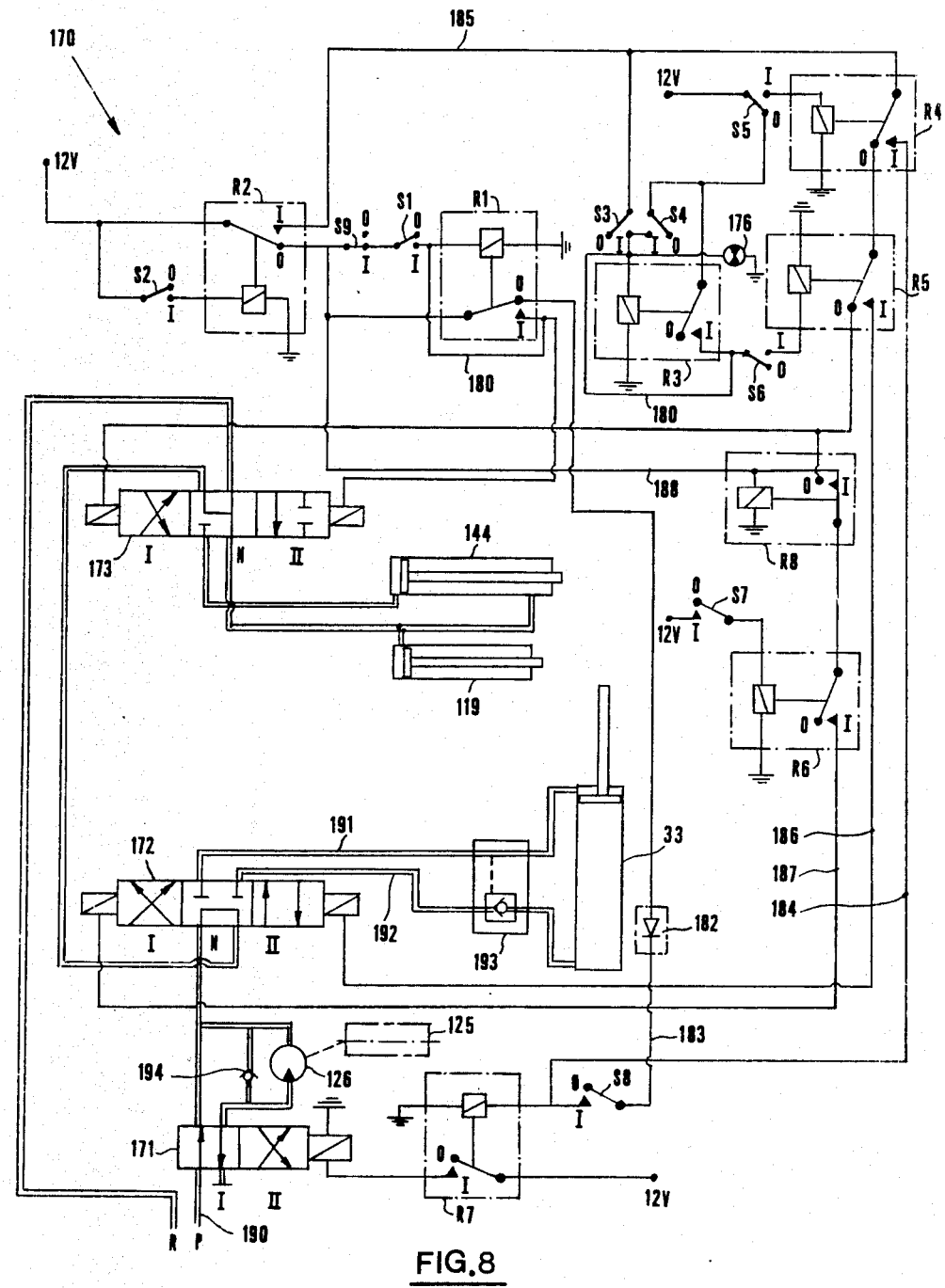
FIG. 8 diagramatically shows the electro-hydraulic circuitry of the machine according to the invention.

FIG. 8 shows the electro-hydraulic control circuitry 170 which is operable to automatically control the various steps in the operation of the bale accumulator 10 subject of the present invention. The hydraulic part of the circuitry not only comprises the hydraulic loadbed, receiving table and shuttle cylinders 33, 119 and 144 as well as the hydraulic motor 126 already described, but also comprises three hydraulic valves 171, 172, 173 which, while interrelated, mainly control the functions of respectively the hydraulic motor 126, the loadbed tipping cylinder 33 and finally the two cylinders 119 and 144 associated with the bale lift 110, i.e. the receiving table 111 and the shuttle 130. A detailed description of these components and their operation will follow hereafter. The electrical part of the circuitry mainly comprises a series of sensors in the form of switches and a series of relays identified respectively with the indices S and R followed by a number.

Considering first the switches, a first on-off switch S1 (receiving table switch) is provided adjacent the rear end of the bale receiving table 111 (as best seen in FIG. 1) and is arranged to be closed only by a bale as the latter is fully supported on the receiving table 111, i.e. when the bale has left the bale case 6 completely. This switch S1 is provided in series, via a further switch S9, to be described furtheron in more details, with the O-connecting point of a relais R2. This relay R2 may be energized by an on-off switch S2 (bale lift latch switch). This switch S2 is associated with the receiving table 111 and is mounted, as can be seen in FIG. 5, on the latching crank 153; the arrangement being such that the switch S2 will be closed and thus relay R2 will be energized when the receiving table 111 is latched in its raised bale transfer position.

A third on-off switch S3 (full load switch) is associated with the bale holding mechanism 60 on the loadbed 40 and, as best can be seen in FIG. 6, is positioned so as to be closed by a cam 175 on the pivot 61 of one of the bent arms 62 as the bale holding mechanism 60 reaches its extreme right hand side position, i.e. as the loadbed 40 is fully loaded with bales. The coil of a relay R3 is coupled in series with the switch S3, which itself is coupled in series with the I-connecting point of relay R2.

A fourth on-off switch S4 (manual control switch) is provided in parallel with the on-off switch S3 and is part of a control box (not shown) in the tractor pulling the baler 5 and accumulator 10. A warning light 176 equally is provided in series with the switches S3 and S4.

A fifth switch S5 (tailgate switch), which is of the two-way type, is associated with the tailgate 80. As is shown in FIG. 7, this switch S5 is actuated by the lifting rod 98. The arrangement is such that, when the tailgate 80 is in its home position, the switch is positioned in its O-position supplying power to the switch S4 and simultaneously also supplying power to the input contacting point of relay R3. Alternatively, when the tailgate 80 is in its fully retracted position, the switch S5 is turned to its I-position energizing the coil of a further relay R4.

Coupled in series with the I-connecting point of relay R3 is a sixth on-off switch S6 (shuttle switch) which is associated with the shuttle 130. As can be seen in FIG. 2, this switch is actuated by an elongated cam 177 on the shuttle 130. The arrangement is such that switch S6 is open when the shuttle 130 is in its extreme left position and is actuated to close as the shuttle 130 is displaced over a short distance to the right; this short distance corresponding to the displacement of the receiving table 111 toward the loadbed necessary for a bale on the receiving table 111 to engage the next preceding bale on the loadbed 40. The arrangement is further also so that the switch S6 is opened again after the shuttle has moved a little further to the right. Preferably the switch S6 is closed as soon as the shuttle 130 has moved over 1/10th of its path in the retracting direction and is re-opened after the shuttle 130 has completed 3/10ths of its path in the same direction. Coupled in series with the switch S6 is the coil of a relay R5 which itself is connected to the relay R4 on the one side and to the hydraulic valves 173 and 172 on the other side.

A seventh on-off switch S7 (loadbed switch) is associated with the loadbed 40 and is arranged to be opened when said loadbed 40 is in its horizontal home position, meaning that this switch S7 is closed as soon as the loadbed departs from its home position. This switch S7, when closed, energizes the coil of a relay R6.

An eighth on-off switch S8 (hydraulic motor switch) is provided on the receiving table 111 at a distance forwardly of the switch S1 and is equally arranged to be closed by a bale arriving on the receiving table 111. Obviously, during operation, this switch S8 will be closed before the switch S1. Said switch S8, when closed, energizes a relay R7 controlling the position of hydraulic valve 171.

A ninth and final on-off switch (lift switch) S9 is provided in series with the receiving table switch S1 between the latter and a relay R2. This switch S9 is arranged to be closed when the receiving table 111 is in its home position and to be opened when the receiving table departs from this position (FIG. 5).

Turning now more specifically to the relays, it is remarked that most of these relays have already been mentioned briefly. However, a relay R1 still should be mentioned. The coil thereof is energized when both the switches S1 and S9 are closed and the relay R2 is in its O-position. The I-connecting point thereof is coupled to the valve 173 while that the O-connecting point thereof is coupled to the hydraulic motor switch S8 via a diode 182.

An eighth and final relay R8 still should be considered. The coil of this relay R8 and the I-connecting point thereof are coupled to the O-connecting point of the relay R2. The O-connecting point of relay R8 is coupled in series with the O-connecting point of relay R5. Said relay R8 is further also coupled in series with relay R6 already mentioned.

Two of the relays in the circuitry, namely R1 and R3, have a back coupling line 180 between the I-connecting point and the supply line to the relay coil so that, when an impulse to the coil triggers the relay for shifting the same to the I-position, this position will be held on as long as power is flowing through the relay and even though the triggering pulse lasts only a short while.

The diode 182 is provided in the line 183 between relay R1 and switch S8 in a manner so that power only can flow from relay R1 to switch S8 thus preventing backfeeding of power from the line 184 to the relay R1 whereby the latter would oscillate between its O-I positions in the event that power is applied on the line 184 and the switches S8 and S1 are closed.

For operation, the bale accumulator 10 is coupled to the rear end of a baler 5 and is pulled together therewith by a tractor (not shown) across a field. Crop material is picked up from the field by the baler 5 and is formed into bales B which move rearwardly through the bale case 6 of the baler 5 for ultimate discharge therefrom.

In the starting condition of the bale accumulator 10, the bale receiving table 111 is positioned in its lowermost and generally centralized position (as seen in the transverse direction) vertically beneath the receiving end 44 of the loadbed 40. In this position, the receiving table 111 is generally aligned with the bale case 6 (as seen in a rear view such as FIG. 2) although the forward end thereof is positioned at a limited distance beneath the level of the lower edge of the bale case outlet. The shuttle 130 thus assumes its extreme right position. The load bed 40 is positioned in its generally horizontal home position above the level of, and rearwardly of the bale case 6. All on-off switches S1-S4, S6-S8 are in their non-conducting or open position O. The tailgate two-way switch S5 is positioned to supply power to the switch S4 and to the relay R3 and the bale lift switch S9 is in the closed position. All relays R1-R7 (thus with the exception of relay R8) are dead in the start condition of the accumulator 10 and thus assume the O-position. In contrast therewith the relay R8 is energized in this start condition, meaning that it assumes the I-position.

Hydraulic pressure P is supplied via the pressure line 190 to the valve 171 which is positioned in its first position I meaning, on the one hand, that the hydraulic motor 126 is not energized and, on the other hand, pressure is further also applied to the loadbed valve 172, which is positioned in its neutral position N. In this position of valve 172, the loadbed cylinder 33 is isolated from the circuitry meaning that this cylinder is kept in its extended loadbed holding position. The pilot operated check valve 193 in the feedlines 191-192 to this cylinder 33 assists in holding the loadbed 40 in its horizontal home position (raised position) in the sense that this check valve reduces hydraulic fluid leakages from underneath the plunger of the cylinder 33, if this leakage is not all together avoided. This check valve 193 also provides a safety feature to the extent that it helps to provide a controlled drop speed of the loadbed 40 when said loadbed is allowed to move toward its bale discharge position.

In the neutral position N of the loadbed valve 172 pressure supplied thereto is passed on to the bale lift valve 173, which equally is positioned in its neutral position N whereby the hydraulic pressure fluid is passed on to the return line R. In the neutral position N of the bale lift valve 173, the bale lift cylinder 119 is coupled to the return line R, whereby this cylinder is kept in its fully retracted position. In the neutral position N of the bale lift valve 173, the double acting shuttle cylinder 144 equally is coupled with its side above the plunger to the return line R, while that its side under the plunger is isolated from the circuitry. In this condition, the shuttle cylinder 144 equally is fully retracted.

As a first bale B exits from the bale case 6 and moves rearwardly onto the receiving table 111, it eventually will actuate the hydraulic motor switch S8 whereby relay R7 will be energized via relay R1, which, at that time, is in its O-position. This causes the valve 171 to shift to its second position II, whereby hydraulic pressure is applied to the hydraulic motor 126 thus driving the bale transfer roller 125 in the appropriate direction for assisting the bale in its rearward movement on the receiving table 111. A check valve 194 in parallel to the hydraulic motor 126 prevents the hydraulic pressure fluid to bypass said motor on the one hand, and, more importantly, permits free-wheeling of the roller 125 and the motor 126 in the same direction when the motor is not energized and a bale tends to drive said roller 125, on the other hand. This condition occurs, as will be explained further, during the unloading cycle.

After the hydraulic motor switch S8 has been closed, the bale B will move further rearwardly on the receiving table 111 until it is fully supported thereon, i.e. until it has left the bale case 6 completely. At this moment the receiving table switch S1 is closed which starts the lifting cycle. Bale lift switch S9 is closed at this moment in the cycle.

In any event, even if the bale transfer roller 125 and its drive means would not have been provided, bales B eventually will be pushed sufficiently far rearwardly on the receiving table 111 to actuate the switch S1 and thus to start the lifting cycle. With bales B of "normal" length no interference problems will be faced. However, if shorter bales B than normal would be made by the baler 5 and if the bale transfer roller 125 were not provided, the next following bale formed by the baler would have to move sufficiently far out of the bale case 6 to push the next preceding bale on the receiving table switch S1, whereby there might be intereference between this next following bale and the receiving table 111 during its lifting cycle and more likely during the return movement thereof to its home position, especially when this return movement is preceded by the bale dumping cycle (to be described furtheron). It indeed should be kept in mind that the next-following bale continues to move rearwardly out of the bale case 6 during the aforementioned lifting, return and bale dumping cycles. The bale transfer roller 125 overcomes this interference problem in the event of the production of undersize bales to the extent that bales are accelerated in their movement along the receiving table and from the moment that they leave the bale case 6 completely. In this manner, the lift cycle is started sufficiently ahead of the moment that the next-following bale is presented for placement on the receiving table 111 so that all aforementioned cycles can be completed in time. The position of the hydraulic motor switch S8 along the length of the receiving table 111 preferably is made adjustable to accomodate bales of different lengths. Indeed, the bale transfer roller 125 should not "pull" on a bale when it is still partially positioned and held in the bale case 6 as, under this condition, the roller 125 would not effectively move the bale along the receiving table 111, whereby the rotating roller would damage the bale. With the hydraulic motor switch S8 being adjustable along the length of the receiving table 111, it may be positioned so that it is actuated by undersized bales issuing from the bale case 6 precisely at the moment that they are released from said bale case.

To help avoid the same type of interference risks, a gap has been provided between the bale case outlet and the forward edge of the receiving table 111 which is sufficiently large for allowing the receiving table 111 to complete its lifting and returning cycles as well as for allowing the loadbed 40 with the bale lift 110 thereon to complete its bale dumping cycle and its subsequent return cycle prior to the next-following bale reaching the location of the receiving table leading edge when in its home position.

Returning now to the condition where the valve 171 is shifted into its position II for driving the hydraulic motor 126, it will also be understood from FIG. 8 that, in this condition, pressure fluid is still applied to the valves 172 and 173 as it issues from said motor 126, which means that any of the cylinders 33, 119 and 144 may be actuated simultaneously with the energization of the hydraulic motor 126.

The bale lifting cycle will now be described in more details. As soon as the receiving table switch S1 is closed, (and as the lift switch S9 is closed at this point in the cycle), relay R1 is energized and switched to its I-position applying a tension to the hydraulic valve 173, which thereby is shifted to its lift position II. A short impulse applied to the coil of relay R1 is sufficient to switch the latter to the I-position and to hold it there for as long as power is applied to said relay. This is obtained by the back coupling line 180 between the I-connecting point and the feed line to the coil thereof. Thus, if switch S1 accidentally were opened again due e.g. to operation on uneven terrain resulting in vibrations etc., the lifting cycle nevertheless would be continued once it has been started.

As valve 173 is shifted to its lift position II, pressure fluid is applied to the shuttle cylinder 144 causing the plunger thereof to extend thus displacing the shuttle 130 to the left. This extension in turn also causes pressure fluid from above the plunger of said shuttle cylinder 144 to pass on to the table lift cylinder 119 which thus equally is extended. In other words, the cylinders 144, 119 act in a master-and-slave relationship. This has the advantageous result that the shuttle 130 with the receiving table 111 mounted thereon is shifted to the left simultaneously with the table 111 being pivoted upwardly through an angle of 90°. This results in the receiving table 111 moving along a "stretched" or elongated curved path from its bale receiving position to its bale transfer position whereby it thus comes from underneath the loadbed 40 to assume a position alongside and generally at the same level of the receiving edge 44 of said loadbed 40. At the same time the bale on the receiving table 111 is turned through an angle of 90°, whereby it is held ready to be placed on the loadbed 40 on its narrower side, although it issues from the bale case 6 with its wider side in the horizontal orientation.

These aspects and features together with still another aspect to be described furtheron allow a loadbed in particular and a bale accumulator in general which remain fully within the acceptable 3.0 meter width and which yet allow the accumulation of a maximum number of bales. More specifically the accumulator according to the invention can accumulate four bales of 90 centimeter high and 60 centimeter wide, one alongside the other.

These aspects and features further also allow a basically symmetrical construction of the accumulator as well as a symmetrical coupling of the accumulator behind the bale case of a baler. For the same reasons, no components (and more especially the bale lift 110) move to any great extent beyond the lateral side edges of the accumulator during operation, which otherwise could be hazardous and under some conditions even could prevent operation.

As the relay R1 is switched at the start of the lifting cycle, the hydraulic motor 126 is de-energized at this point in the cycle and as can be derived from an analysis of FIG. 8. Consequently, the bale transfer roller 125 is stopped as soon as the table switch S1 is actuated by a bale arriving thereon.

As the receiving table 111 reaches its fully raised bale transfer position, the latch roller 156 of the lift latch 150 snaps behind the cam 151 as already explained whereby the receiving table 111 becomes mechanically latched in said fully raised position. Simultaneously, the latch switch S2 is closed whereby relay R2 is shifted from its O-position to its I-position. Consequently relay R1 is de-energized and thus returns to the O-position, whereby the hydraulic valve 173 is no longer held in the lifting position II. Relay R2 applies power via line 185 and relays R4 and R5, which both are still in the O-position, to the valve 173 to shift the latter to its position I. Thereby hydraulic pressure fluid is applied to the lift cylinder 119, which already fully is extended and whereby the latter thus is maintained hydraulically in its fully raised position. The receiving table 111 thus is latched both mechanically and hydraulically in its fully raised position. However pressure fluid is also applied to the shuttle cylinder 144 above the plunger thereof whereby the latter is caused to retract thus urging hydraulic fluid from beneath the plunger into the return line R. Retraction of the shuttle cylinder 144 causes the shuttle 130 with the receiving table 111 thereon to move to the right. Recesses 178 in the loadbed 40 at the receiving edge 44 thereof allow this shuttle movement with the receiving table in the raised position. The inclined sections 122 of the supports 113 and the bale support members 116 thereon enter said recesses 178.

As the receiving table 111 is shifted to the right the bale B thereon is transferred onto the load surface 42 of the loadbed 40 and against the bale holding member 65 of the bale holding mechanism 60, which gradually retracts opposite to the force of spring 66 as the bale is moved onto said surface 42. As the bale B is transferred onto the loadbed 40, it is pushed underneath the bale retainer mechanism 47 which gives away to the extent required. The combined action of the bale retainer mechanism 47 and the bale holding mechanism 60 guarantees that the bale or bales B placed on the loadbed 40 are kept thereon in the upright position even when the machine is operated on rough terrain and after the receiving table 111 has returned to its home position. The action of the bale retainer mechanism 47 is sufficiently known from the bale wagon art and therefore does not require further explanation. The spring 66 of the bale holding mechanism 60 is sufficiently strong to prevent undue shifting of the bale or bales on the loadbed 40 to the right, whereby the bale adjacent the bale receiving edge 44 of the loadbed 40 is firmly held against the retainer members 49 of the mechanism 47. Any tentative movement of this bale to the left is adequately prevented by these members 49. The shock absorbers or damping cylinders 69 also assist in accomplishing this holding of the bales in position on the loadbed 40.

As the bale B fully is transferred onto the loadbed 40, the shuttle 130 reaches its extreme right position and the shuttle cylinder 144 thus is fully retracted. Simultaneously therewith the chain 158 (FIG. 5) becomes tensioned thus unlatching the lift latch 150 in a direction opposite to the spring force acting thereon.

Consequently latch switch S2 also is opened, whereby the hydraulic valve 173 is de-energized and allowed to return to its neutral position N. Thus the mechanical and hydraulical latchings of the receiving table 111 are released, whereafter the weight thereof together with the action of spring 120 cause the table 111 to pivot around pivot 118 toward the home position. As this occurs, the plunger of the lift cylinder 119 retracts, urging hydraulic pressure fluid into the return line R. As the table 111 returns to its home position the switches S1 and S8 are re-opened; the switch S2 having been re-opened already previously. As the receiving table 111 reaches its home position, switch S9 is closed again. It is remarked that the table 111 returns to its home position through a truely circular path; the linear movement of the shuttle 130 to the right having been completed previously.

When the receiving table 111 departs from its home position, the lift switch S9 is opened; without any effect however, as the relay R2 remains energized for the reasons already explained. This means that the lifting cycle is continued without interruption. However, when subsequently the return cycle should start (i.e. when the latch switch S2 is opened again, to de-energize relay R2), the receiving table switch S1 still may be in its closed position as said table still may abut against the bale B previously supported thereby. This condition, in the absence of the bale lift switch S9, would prevent the start of the return cycle as indeed, when relay R2 is returned to its O-position and when the receiving table switch S1 is closed, the circuitry would call for a lifting of the receiving table 111 through the energization of relay R1. This energization is prevented by the switch S9 which is open when the receiving table 111 is in any other position than its home position. In other words, when the receiving table 111 is in its raised position, it first will have to be lowered completely until it reaches its home position and until the bale lift switch S9 is closed before a command for raising the receiving table 111 again can become effective.

As further bales B issue from the bale case 6, the cycles explained so far, are repeated, whereby subsequent bales are placed the one after the other on the loadbed 40 against the next preceding bale placed thereon. Any time a further bale B is placed on the loadbed 40, the bales B already positioned thereon are pushed further to the right over a width of one bale and against the action of the bale holding mechanism 60. Said bale holding mechanism 60 is pushed back over a corresponding distance. In the preferred embodiment this may be repeated three times with bales of a width of 60 centimeter, whereafter the first bale on the loadbed 40 is positioned adjacent, but not yet at the extreme right edge of the loadbed 40. Thereby the full load switch S3 associated with the bale holding mechanism 60 just is not yet closed.

As a fourth bale B enters the accumulator 10, the same cycles described so far equally are repeated up to the moment where the receiving table 111 is mechanically latched in its raised position and the shuttle 130 begins its retracting movement toward the right. This retracting movement soon results in the shuttle switch S6 becoming closed. As the shuttle switch S6 is closed, the bale B on the receiving table 111 engages the third bale B on the loadbed 40. Should at this moment the full load switch S3 still be open, as is normal, then nothing else is changed in the operating condition, which means that the shuttle 130 with the table 111 thereon continues to retract (valve 173 still being energized and held in its I-position via line 185 and relays R4 and R5). At this point in the cycle, the tailgate switch S5 is not yet actuated and thus still is positioned in the O-position. Consequently power is applied to the input side of the relay R3. When the shuttle 130 has moved a short distance further to the right, thus pushing the three bales on the loadbed 40 over a corresponding distance in the same direction and positioning the first bale in its extreme right position on said loadbed 40, the full load switch S3 associated with the bale holding mechanism 60 is closed. Thereby the relay R3 is energized and shifted to the I-position. Similarly as with respect to relay R1, an impulse to the coil of relay R3 is sufficient for shifting and holding the latter in the I-position for as long as power is applied to its feed line.

Energization of relay R3 and closure of the full load switch S6 result in the energization of relay R5 which thus also is switched to the I-position, whereby the power supplied to the valve 173 is cut off. Accordingly, this hydraulic valve 173 is returned to its neutral position N, interrupting the retracting movement of the shuttle 130. This means that the shuttle 130 is hydraulically locked in a "slightly" retracted position in the sense that it cannot return to the left. This also means that the lift latch 150 remains in its latching position holding the table 111 in its fully raised position. In this position the bale support means 116 extend generally alongside the bale receiving edge 44 of the loadbed 40 and generally at the level of the latter, whereby these support means 116, in effect, become part of the loadbed 40 during the bale dumping movement thereof and thus effectively enlarge the bale holding capacity thereof.

Shifting of the relay R5 to the I-position results in power being applied via lines 185, 186 and relays R4 and R5 to the "dumping" coil of the valve 172, which thus is shifted to its bale dumping position II. Pressure is thus applied to the loadbed cylinder 33 above the plunger thereof. This pressure also opens the pilot controlled check valve 193 whereby hydraulic pressure fluid is permitted to drain in a controlled manner from underneath the plunger into the return line R. Accordingly said plunger retracts permitting the loadbed 40 to gradually tip rearwardly at a controlled speed.

As the dumping cycle is started, the tailgate 80 still is temporarily latched in its extended position. This condition is maintained until the loadbed 40 is inclined to the horizontal at an angle of about 30°; whereby at this moment, all four bales have already started sliding along the load surface 42 to engage the tailgate. This guarantees that, when subsequently the tailgate 80 is retracted, all four bales will drop precisely at the same moment nicely alongside each other on the ground so that subsequent picking up and further manipulation of the bales will be facilitated.

As the loadbed 40 tips further downwardly beyond the 30° position, the chain 96 of the latch mechanism 84 becomes tensioned and the latch pin 86 accordingly is retracted, allowing the tailgate 80 to retract under the action of the bales B resting thereagainst. Consequently all four bales B slide downwardly in a rearward direction along the loadbed 40 to arrive alongside and against each other on the ground in an orderly arranged grouping.

As the tailgate 80 retracts, the tailgate switch S5 is switched by the rod 98 to its I-position resulting in the energization and switching to the I-position of the relay R4. This interrupts the retraction of the loadbed lifting cylinder 33 and the tipping movement of the loadbed 40 as the valve 172 is allowed to return to its neutral position N. Switching of the tailgate switch S5 also de-energizes the relays R3 and R5 whereby the latter both reset to the respective O-positions. This, in itself, has no further effect as the switching of relay R4 has already resulted in the interruption of the loadbed lowering movement.

As the bales B are allowed to slide off the loadbed 40, power again is applied via relay R4 and lines 185, 184 to the hydraulic motor 126 which thus is driven once more. This time, the roller 125 driven thereby assists in the discharge of the fourth bale and indirectly also of the other bales from the loadbed 40. It is remarked in this respect that during the dumping cycle the fourth bale rests on the bale support plates 116 of the receiving table 111 and which are shaped and dimensioned in a way so that they possibly may hamper the smooth discharge of the fourth bale. Thus a "little" assistance is appropriate.

If the diode 182 were not provided in the line 183, power would also be applied from the line 184 to the relay R1, which at this moment is in the O-position (as relay R2 is in the I-position). This would result in a continuous switching of the relay R1, which, of course, is not acceptable. The diode 182 avoids this problem.

During the dumping cycle, the bale retainer mechanism 47, which is mounted on the loadbed 40, is retracted to a raised bale releasing position. This is accomplished by the spring 57 which is allowed to extend, pushing the rod 52 down as the loadbed 40 starts tipping. Thus this mechanism does not interfere with the unloading operation. The orientation of the holding member 65 of the bale holding mechanism 60 equally avoids interference thereof with the bale unloading. As soon as the bales have been discharged fully from the loadbed 40, said bale holding member 65 automatically returns to its initial position adjacent the receiving edge 44 of the loadbed 40, thus causing the full load switch S3 to re-open.

The bales actually slide off the loadbed 40 as the accumulator 10 is moved forwardly across the field. The loadbed is kept in its lowermost position until the tailgate 80 comes from underneath the bales being dumped, whereafter the spring 97 is allowed to return the tailgate 80 to its home position and whereby the two-way tailgate switch S5 is returned to its O-position. At this moment, drive of the bale transport roller 125 is interrupted (by the switching of relay R4 to the O-position). In this condition power is applied to the lifting coil of the hydraulic valve 172 via the line 185 and the relays R4, R5, R8 and R6 and the line 187. Indeed, in this condition, the relays R4 and R5 have already returned to the O-position. At that moment, the table latch switch S2 is still closed whereby relay R2 is in its I-position, resulting in the relay R8 being deenergized and thus being held in its O-position, whereby also this relay R8 participates in establishing the connection between the lines 185 and 187. Finally relay R6 is also held in its I-position as the loadbed switch S7 is closed as soon as the loadbed 40 has departed from its home position, thus energizing said relay R6. Thus power is supplied to the "lift" side of the valve 172 and the latter is thus shifted to its "lift" position I, whereby the loadbed cylinder 33 is extended returning the loadbed 40 to the horizontal home position. As the loadbed 40 reaches this home position, the loadbed switch S7 is re-opened, whereby relay R6 is de-energized and returned to its O-position thus allowing the valve 172 to return to its neutral position N for interrupting the raising of the loadbed 40.

Simultaneously as the loadbed 40 is returning to its home position, power is also applied from the line 185 via relays R4 and R5 to the hydraulic valve 173 for shifting the same in the position I, whereby the shuttle 130 is now retracted further to the right until it reaches its fully retracted position to the right of the accumultor 10. Indeed, hydraulic pressure fluid from above the plunger of the loadbed cylinder 33 is urged via the positions I of valves 172 and 173 into the shuttle cylinder 144 above the plunger thereof, thus causing this plunger to retract further. The receiving table 111 is still kept in its raised position. In this condition the cylinders 33 and 144 now operate in an opposite master-and-slave cofiguration.

As explained before, the bale lift latch 150 is unlatched when the shuttle 130 reaches its fully retracted position. This, again as already explained, permits the receiving table 111 to pivot to its home position, as the table latch switch S2 is opened, and the relay R2 is de-energized cutting the power supply via relays R4 and R5 to the hydraulic valve 173, whereby the latter is allowed to return to its N position and the hydraulic pressure fluid is allowed to drain from the table lift cylinder 119. As relay R2 returns to the O-position, power supply to the loadbed lift valve 172 via the relays R4 and R5 equally is cut, whereby raising of the loadbed 40 would be interrupted prematurely. This is, of course, not acceptable, and is overcome in the following manner: when relay R2 returns to its O-position, thus cutting off the power supply to the valve 172 via the relays R4 and R5, power is subsequently again supplied to said valve 172 from the O-position of relay R2 via the line 188 and the relay R8, which is shifted from its O-position to its I-position. Thus the loadbed 40 continues its return movement.

It is remarked that the further retracting of the shuttle 130 and the subsequent returning of the receiving table 111 to its home position occur while the loadbed 40 itself is returning to its own horizontal home position. The arrangement preferably is such that the loadbed 40 and the receiving table 111 reach their respective home positions substantially at the same time. Thereby the return cycle, of course, is kept as short as possible. However, more importantly, possible interference of the receiving table 111 with the next following bale issuing from the bale case 6 is also avoided (because of the short time needed for completing the return cycle).

Such interference of the receiving table 111 with the next following bale issuing from the bale case 6 as well as further possible intereference of the return table 111 with the ground, equally is avoided by the fact that the receiving table 111 is returned to its home position only toward the end of the return cycle of the loadbed 40, which means that, at this point in the cycle, the loadbed 40 is close to its horizontal position, and which in turn also means that the forward edge of the receiving table 111 does not project substantially further forwardly, on the one hand, and that the rear edge of the receiving table 111 does not project substantially further downwardly, on the other hand, during its own return cycle. This is accomplished by the appropriate timing of the respective retraction and return cycles.

As already mentioned, the arrangement is preferably so that the loadbed 40, and the receiving table 111 reach their respective home positions substantially at the same time. However, should this not be the case and should instead, the loadbed 40 reach its home position prior to the receiving table 111 reaching its home position, the receiving table 111 nevertheless will complete its return stroke as valve 173 remains in its I-position only till the bale lift latch 150 is released, whereafter the receiving table 111 can pivot to home position with the valve 173, in its neutral position. This is fully independent from whether valve 172 assumes either its loadbed lifting position I or its neutral position N.

Alternatively, if the receiving table 111 reaches its home position prior to the loadbed 40 reaching its home position, the latter equally nevertheless will complete its return movement. In this situation a certain switching of components is necessary. Indeed, the valve 172 initially is held in its loadbed lifting position I by power being applied thereto through the relays R4, R5 and R8 which assume the O-position and relay R6 which assumes the I-position. As the receiving table latch 150 is released, the latch switch S2 is opened, whereby relay R2 is shifted to the O-position, thus cutting the power to line 185 and the relays R4, R5 in series therewith. However, and as already explained, power is now applied via the O-position of relay R2 and line 188 to the relay R8 which is energized and switched to the I-position. Power is further also applied via the I-position of relay R8 and via relay R6 to the loadbed lifting side of the valve 172, whereby raising of the loadbed 40 thus is continued till relay R6 is de-activated by the loadbed switch S7 as the loadbed 40 reaches its home position.

Should, for the one or other reason, e.g. oil leakage, the loadbed 40 start to pivot rearwardly prematurely, it always will be "called back" immediately. Indeed, when the loadbed 40 leaves its home position, the loadbed switch S7 is closed energizing relay R6 thus shifting it to the I-position. Assuming now that the receiving table 111 is unlatched, i.e. in any position other than the bale transfer position, power is applied to the valve 172 for shifting it to the I-position (raise loadbed) via the O-connecting point of relay R2, line 188, relay R8 which is energized and shifted to the I-position and relay R6. Alternatively, if the receiving table 111 is latched in its bale transfer position and, unless the circuitry is in condition for dumping bales, power is applied to the same side of valve 172 via the I-connection of relay R2, line 185, relays R4, R5 and R6 which all are in the O-position and relay R6. In both cases the loadbed 40 thus indeed immediately will be raised again.

The shuttle switch S6 effectively is a safety device which, under certain circumstances, may prevent a premature triggering of the bale dumping cycle, especially in the situation where a third bale has been placed on the loadbed 40. Indeed, as already explained, the first bale on the loadbed 40, under these circumstances, is positioned so as to just not yet close the full load switch S3 associated with the bale holding mechanism 60. Operation of the accumulator on rough ground nevertheless could cause the first bale on the loaded to pivot the holding mechanism 60 further and to trigger the full load switch S3 prematurely. However, this has no effect, even when the receiving table 111 is latched in its raised position, as indeed, under these circumstances the shuttle switch S6 is open (as the shuttle 130 is in its fully retracted position or in a position close thereto). Thereby relay R5 remains in its O-position thus interrupting the power supply to the "dump" side of the loadbed valve 172. Only when the receiving table 111 is raised with the fourth bale thereon, and when the shuttle 130 has made an initial retracting movement, will it be possible to start the dumping cycle as under these circumstances the shuttle switch S6 is closed.

Having now completed the description of the bale dumping cycle and the return cycle of the loadbed 40, it will be clear that the receiving table 111 remains in its fully raised position during said dumping cycle. Said table 111 furthermore also remains in an almost fully extended position to the left during said dumping cycle, so that, effectively, the receiving table 111 becomes an integral part of the loadbed 40 increasing the total surface thereof with about 25%. Indeed the loadbed 40 per se holds only three bales of the size as already mentioned. With the table 111 in the position as described during the dumping cycle, the "enlarged" loadbed 40 holds four bales.

This is another advantageous feature of the bale accumulator according to the invention which contributes to the desirable result of having a bale accumulator which remains fully within the acceptable 3 meter width and which yet allows the accumulation of a maximum number of bales. This aspect also aids to obtain a basically symmetrical construction of the accumulator as well as to allow a symmetrical coupling of the accumulator behind the bale case of a baler.

So far, the operation of the accumulator under "normal" circumstances has been described. However, there may be circumstances where the operator wants to dump fewer bales than four at a time. In other words, there may be circumstances where the operator may want to interfere with the automatic operation and dump either one, two or three bales at a time. Such a circumstance may occur e.g. at the end of the baling operation on a field.

To make this possible, a manual control switch S4 has been provided in series with the tailgate switch S5 and the coil of the relay R3 on the one hand, an in parallel with the full load switch S3, on the other hand, in a manner so that, when the tailgate switch S5 is in the O-position; i.e. the tailgate 80 is in its home position, and when the manual control switch S4 is closed, the relay R3 is energized to shift from the O-position to the I-position thus applying power to the I-connecting point. As already explained, when the relay R3 is shifted to its I-position, the dumping cycle will start provided certain other conditions are met. Furthermore, and also as already explained, the relay R3 will remain in the I-position for as long as power is applied to the I-connecting point, i.e. for as long as the tailgate 80 remains in its raised position. Accordingly, the operator may actuate the manual control switch S4 at any moment in the cycle of the bale accumulator whereby the relay R3 will be set for initiating the bale dumping cycle as soon as all conditions required for the dumping cycle to be carried out without any interference problems, are met.

Indeed, the loadbed hydraulic valve 172 will not be shifted into its bale dumping position II unless power is applied to the corresponding coil thereof via the line 185, the O-position of relay R4 the I-position of relay R5 and the line 186. Power will be applied to line 185 only if relay R2 is shifted to its I-position; i.e. if the table latch 150 is operative to lock the receiving table 111 in its bale transfer position and thus also if the table latch switch S2 is closed. In practice this means that the loadbed 40 will not be pivoted to dump bales, when a next bale is inching its way onto the receiving table 111, which, if not prevented, would cause serious interference problems as readily will be understood. Thus, while the operator may have actuated the manual control switch S4 at an earlier stage to start the bale dumping cycle, the system will not actually start the dumping until a next bale has been positioned fully on the receiving table 111 and until the latter has been raised to its bale transfer position with the shuttle 130 in its extended position to the left, at which time bale dumping without interference is possible.

Similarly, if the bale accumulator is in the process of completing a dumping cycle, it has no sense for the operator to trigger a new dumping cycle. Therefore, if an operator were to actuate the manual control switch S4 under these circumstances, this will have no effect once the tailgate switch S5 has been shifted to the I-position; i.e. the tailgate 80 has been lowered. Indeed, with the tailgate switch S5 in the I-position, it is impossible to energize the relay R3 by means of the manual control switch S4. Thus the relay R3 remains deactivated and furthermore, relay R4 has been shifted to the I-position, whereby the power supply line to the "lowering" coil of the valve 172 has been interrupted.

As soon as the lift latch switch S2 has been closed, i.e. when a further bale has been placed on the bale receiving table 111 and when the latter has moved to its bale transfer position, power is applied, as already described, via line 185 and the O-positions of relays R4 and R5 to the hydraulic valve 173 shifting the latter in the I-position whereby the shuttle 130 starts its retracting movement to the right hand side of the accumulator and with the receiving table 111 latched in its raised bale transferring position. Initially the shuttle switch S6 is still open but after about 1/10th of the shuttle retracting movement, said switch S6 closed is by the cam 177, thereby also energizing relay R5. Hence the shuttle retraction is interrupted as the power supply to the valve 173 is cut (by relay R5). Instead thereof, power is now applied from line 185 and relay R4 (O-position) through relay R5 (I-position) and line 186 to the "dump" side of the loadbed valve 172 whereby bale dumping is effectively started. Closure of the shuttle switch S6 after 1/10th of the shuttle retracting movement guarantees that the bale on the receiving table 111 firmly engages the next preceding bale placed on the loadbed 40 (provided there is such bale on the load bed), prior to starting the bale dumping operation. This facilitates the simultaneous dumping of all bales in the machine and furthermore also helps to place the bales in a close grouping on the field as is desirable.

From what precedes, it thus will be clear that a load of 1, 2 or 3 bales; i.e. an incomplete load of bales can be discharged from the accumulator if the operator wants to do so. In other words, bales can be discharged even when the full load switch S3 is not actuated.

The position of the shuttle 130 at the start of the dumping cycle as specified above (1/10th of the retraction), is ideal to avoid interference problems during the return cycles of both the loadbed 40 and the receiving table 111. Indeed, once the load is placed on the ground, the loadbed 40 returns to its home position in the manner as already explained. Simultaneously, the shuttle 130 continues its retracting movement (9/10ths) until the lift latch 150 is released and the latch switch S2 is re-opened, whereafter the receiving table 111 equally returns to its home position. With the shuttle 130 in the 1/10th retraction position at the start of the dumping cycle, it will take about the same amount of time for the shuttle 130 to completely retract and subsequently for the receiving table 111 to return to its home position as it takes for the loadbed 40 equally to reach its home position. This, as already explained, avoids interference problems.

However, the operator possibly also could actuate the manual control switch S4 as the shuttle 130 is approaching or actually is positioned in its fully retracted position. If the bale dumping cycle were to start at this point, the load indeed would be discharged in the desirable manner. However interference problems would occur during the return cycles of the loadbed 40 and the receiving table 111. Indeed, under these circumstances, it would take substantially less time for the receiving table 111 to reach its home position than it would take for the loadbed 40 to do the same. Thus, the receiving table 111 would reach its home position while that the loadbed still is in a steeply inclined position and, as has been explained before, this would cause interference problems. This problem is avoided by the arrangement whereby the shuttle switch S6 is re-opened again as soon as the shuttle 130 has completed 3/10ths of its retracting movement. Thereby, and if the shuttle 130 has completed more than 3/10ths of its retraction movement, relay R5 will remain de-activated upon the closure of the manual control switch S4 to activate relay R3. Consequently, the bale dumping cycle will not take place. Instead, the bale on the receiving table 111 is transferred fully onto the loadbed 40 whereafter the receiving table 111 returns to its home position for receiving a next bale from the baler. The bale dumping cycle only will be started if and when the receiving table 111 is moved to its raised bale transfer position for placing this next bale onto the loadbed 40 and with the shuttle 130 at the 1/10th retracted position described herebefore.

From what precedes, it thus will be clear that, if the operator wants to manually interfere to discharge an incomplete load, he should not worry about the precise moment to actuate the manual control. Indeed, the circuitry effectively will carry out the dumping cycle only as soon as all conditions therefore are right.

The manual control switch S4 is part of a control box also comprising the warning light 176 and which conveniently can be installed within the tractor cab. The light 176 lights on as soon as either the operator has pushed the manual control switch S4 or the full load switch S3 has been closed. In any event, the warning light 176 lights on when a bale dumping cycle is forthcoming.

It will be clear from what precedes that the bale accumulator according to the invention accomplishes the objectives set forward in the introduction of this specification.

It further also will be apparent to those skilled in the art that various changes may be made in form, construction and arrangement of the bale accumulator without departing from the spirit and scope of the invention or sacrificing all of its material advantages; the form hereinbefore described being merely a preferred or exemplary embodiment thereof.

Figure 9:
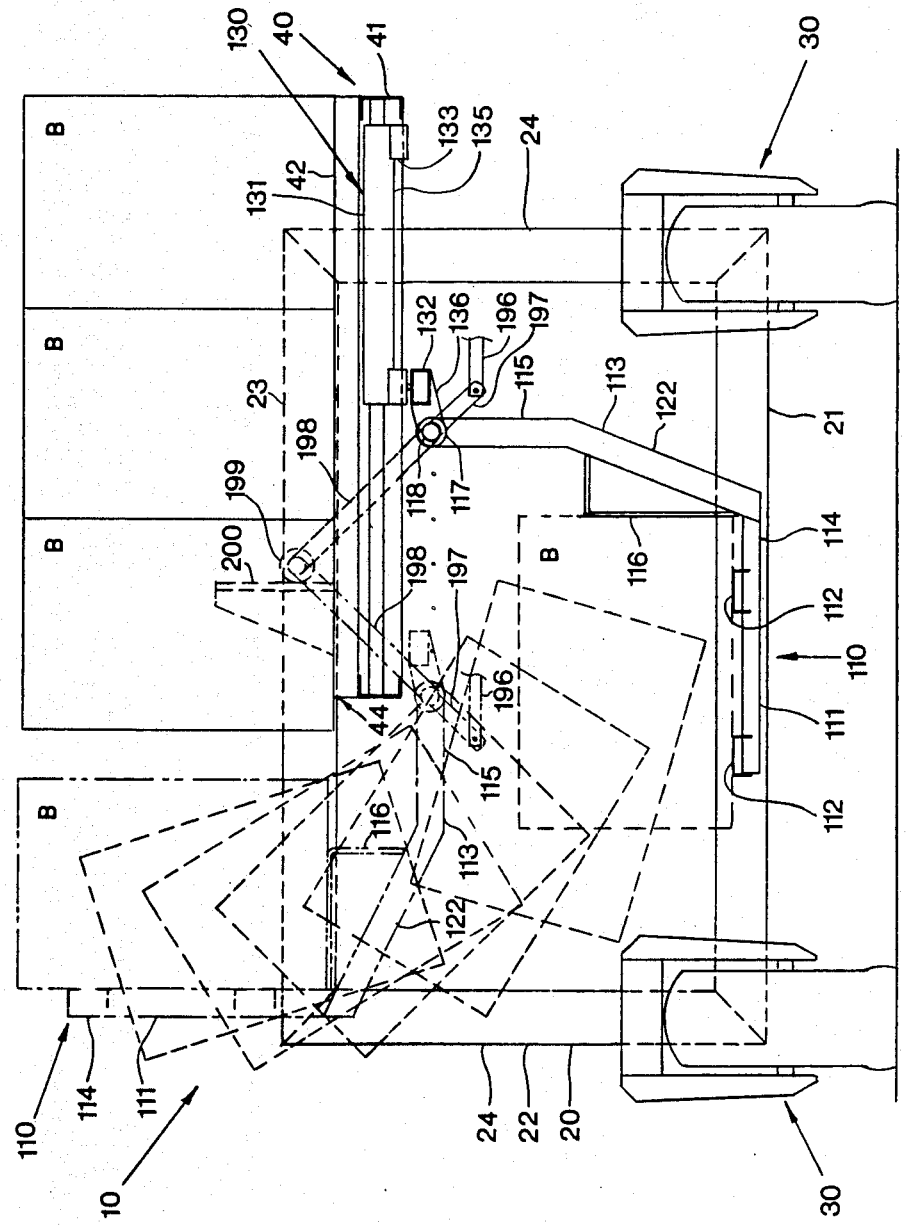
FIG. 9 is a view similar to FIG. 2 showing an alternative embodiment of the present invention.

With reference to FIG. 9 an alternative embodiment of the present invention briefly will be described. Identical components have been identified by the same reference numerals as used in FIGS. 1–8. The shuttle cylinder 144 and the bale lift cylinder 119 of the arrangement according to FIGS. 1–8, have been replaced, in the arrangement according to FIG. 9, by only one double acting cylinder 196 which is provided between a pivot point on the loadbed 40, on the one hand, and an arm 197 welded to a bushing 117, on the other hand. A further arm 198 is welded at one end to another bushing 117 and has a roller 199 at its other end which is disposed to ride against an upright stop 200 on the loadbed 40.

When a bale B is positioned on the receiving table 111 and the cylinder 196 is actuated to extend, the shuttle 130 is moved to the left while that the roller 199 is moved in an upward direction along the stop 200. This, in turn, causes the shaft 118 with the receiving table 111 fixedly secured thereto to pivot upwardly through an angle of 90°. Thus, the shuttle 130 is moved to its fully extended position simultaneously with the receiving table 111 pivoting to its bale transferring position or, in other words, like in the arrangement according to FIGS. 1–8, the bale receiving table 111 is moved through a combined elongated and curved path from its bale receiving position to its bale transferring position. The orientation of the arms 197, 198 when the receiving table is in its raised position, is shown in dotted lines in FIG. 9.

As the receiving table 111 reaches its fully raised position, it again is latched therein by bale lift latch means 150. Subsequent retraction of the cylinder 196 initially causes the shuttle 130 to return to its fully retracted position with the receiving table 111 in the raised position. As this fully retracted position is reached, the bale lift latch 150 is released and subsequently the receiving table 111 may pivot by gravity through an arcuate path back to its home position.

From what precedes, it thus will be clear that, even with a simple mechanical construction including only a single double acting cylinder, it is possible to move the receiving table from its home position through a single elongated and curved path to its bale transfer position on the one hand, and to move the receiving table from its raised position back to its home position, initially through a linear path and subsequently through a truely arcuate path, on the other hand.

Having thus described the invention, what is claimed is:

1. In a bale accumulator for use in conjunction with a baler from which, during operation, bales successively are discharged, the bale accumulator including a bale receiving table movable between a home position for receiving a bale from the baler and a bale transfer position, a loadbed disposed to receive bales from the bale receiving table and to accumulate a plurality of bales thereon, positioning means for moving the bale receiving table between its home position and its bale transfer position, the bale receiving table being disposed at least partially vertically underneath the loadbed when in its home position, the position means being operable to move the bale receiving table from its home position underneath the loadbed to its bale transfer position generally alongside and at the level of the loadbed, wherein the improvement comprises:

the bale receiving table being pivotally mounted on a shuttle mechanism which itself is movable along a transfer linear path between retracted and extended positions; the shuttle mechanism assuming its retracted position and the bale receiving table assuming a lower position when the bale receiving table is located in its home position, and the positioning means, when moving the bale receiving table to the bale transfer position, being operable to simultaneously pivot the bale receiving table upwardly around its pivotal mounting on the shuttle mechanism and to translate the shuttle mechanism with the bale receiving table thereon from its retracted position to its extended position; so that the bale receiving table is moved through a composite path of elongated curved shape.

2. In a bale accumulator according to claim 1, wherein the bale receiving table, when in its home position, is located generally centrally of the transverse width of the accumulator and wherein the loadbed extends from adjacent one side edge of the accumulator in a transverse direction over at least half the width of the accumulator, thus overlaying at least partially the bale receiving table when in its home position.

3. In a bale accumulator according to claim 1, wherein for transferring a bale from the bale receiving table onto the loadbed when the bale receiving table is in its bale transfer position, the positioning means is operable to translate the shuttle mechanism with the bale receiving table thereon from the extended position through a linear path in the direction toward the retracted position.

4. In a bale accumulator according to claim 3, characterized in that, when the shuttle mechanism is in its retracted position after having transferred a bale onto the loadbed, the positioning means is operable to pivot the bale receiving table through a circularly shaped path back to its home position.

5. In a bale accumulator according to claim 4, wherein latching means are provided for firmly securing the bale receiving table to the shuttle mechanism, the latching means becoming engaged as the bale receiving table reaches its bale transfer position upon completion of its composite movement from its home position toward said bale transfer position, the latching means remaining engaged during movement of the shuttle mechanism from its extended position toward its retracted position, and the latching means becoming released as the shuttle mechanism reaches its retracted position for permitting subsequent pivotal movement of the bale receiving table relative to the shuttle mechanism back to its home position.

6. In a bale accumulator according to claim 5, wherein the positioning means comprises a first hydraulic cylinder acting between the shuttle mechanism and the bale receiving table for pivoting the latter relative to the shuttle mechanism, and a second hydraulic cylinder acting upon the shuttle mechanism for inducing the transverse linear movement to the shuttle mechanism back and forth between its extended and retracted positions; the first and second cylinders being provided in a master-and-slave relationship and the latching means being cooperable therewith to provide simultaneous operation of both cylinders when moving the bale receiving table from the home position to the bale transfer position, and to provide consecutive operation of the second cylinder and subsequently the first cylinder when moving the receiving table from the bale transfer position back to the home position.

7. In a bale accumulator according to claim 5, wherein the positioning means comprises:
  first and second arms fixedly mounted on the pivotal mounting of the bale receiving table;
  a single hydraulic cylinder acting on the first arm;
  a stop disposed for the free end of the second arm to abut thereagainst;
  said single cylinder, the first and second arms, and the stop cooperate to translate the shuttle mechanism from its retracted position toward its extended position while pivoting the bale receiving table around its pivotal mounting on the shuttle mechanism away from its home position; and,
  when the latching means have been engaged upon the bale receiving table reaching the bale transfer position, and as said single cylinder is retracted, the shuttle mechanism and the bale receiving table are translated as a unit in the direction toward the retracted position of the shuttle mechanism; whereafter, upon the shuttle mechanism reaching its retracted position and the latching means becoming disengaged, the bale receiving table is allowed to return by gravity toward its home position through a circularly shaped path.

8. In a bale accumulator according to claim 3 wherein:
  the bale receiving table comprises a bale receiving surface fixedly connected by mounting legs to the pivot mounting of the bale receiving table; the bale receiving surface and the mounting legs, when seen in the home position of the bale receiving table, extending respectively generally horizontally and generally upright and the mounting legs further having inclined sections adjacent the bale receiving surface and bale support members secured thereto at right angles relative to the bale receiving surface for supporting a bale as the bale receiving table is moved to its bale transfer position; and
  recesses are provided in the loadbed at the bale receiving side thereof for allowing said bale support members and the inclined mounting leg sections to move therein as the shuttle mechanism is moved from its extended position toward its retracted position.

9. In a bale accumulator according to claim 6 wherein the shuttle mechanism is formed by a generally rectangular subframe pivotally supporting at one side the pivotal mounting of the bale receiving table and having transversely spaced apart rollers rotatably mounted on a pair of transverse beams for riding in transverse channel members on the accumulator.

10. In a bale accumulator according to claim 9 wherein the positioning means further comprises a pivot arm pivotally mounted at one end on the accumulator and having the other end thereof arranged for riding in a generally fore-and-aft extending channel member on the shuttle mechanism; the second cylinder being arranged to angularly displace the pivot arm for moving the shuttle mechanism between its extended and retracted positions.

11. In a bale accumulator according to claim 5 wherein the latching means comprises:
  a latching cam fixedly secured to the pivotal mounting of the bale receiving table;
  a crank mechanism pivotally mounted on the shuttle mechanism and having an arm arranged to ride over the latching cam and snap therebehind for latching the bale receiving table in a fixed position relative to the shuttle mechanism as the bale receiving table reaches its bale transfer position;
  spring means coupled to the crank mechanism for urging the latter toward its latching position; and
  declutching means coupled to the crank mechanism for moving the latter opposite to the spring force acting thereon for releasing the latching means when the shuttle mechanism reaches its retracted position.

12. In a bale accumulator according to claim 1, wherein the loadbed is pivotally mounted on a frame around a transverse pivot axis for dumping bales accumulated thereon as a unit in a rearward direction on the ground, and wherein the shuttle mechanism with the bale receiving table mounted thereon is transversely movably mounted on the loadbed.

13. A method for accumulating bales as they successively are discharged from a baler during a baling operation and for dumping accumulated bales as a unit on the ground and using a bale accumulator therefore comprising a bale receiving table and a loadbed; the method comprising the steps of:
  receiving a bale from the baler on the bale receiving table,
  transferring the bale received on the bale receiving table from the latter onto the loadbed,
  repeating the receiving and transferring steps until a plurality of bales is accumulated on the loadbed, and
  dumping the bales accumulated on the loadbed in a rearward direction as a unit onto the ground;
  the improvement wherein the method further comprises that:
  during the receiving steps, the bale receiving table is positioned at least partially vertically underneath the loadbed, and
  the bale transferring step comprises the further steps of:
  moving the bale receiving table with the bale thereon from its home position underneath the loadbed through a composite path to a bale transfer position alongside and generally at the level of the loadbed; the composite path being obtained by a simultaneous pivoting movement of the bale receiving table around a pivot and a linear translating movement of the pivot together with the bale receiving table in a direction away from its home position underneath the loadbed;
  subsequently translating the bale receiving table with the bale thereon in the opposite direction along a linear path for actually transferring the bale from the bale receiving table onto the loadbed, and
  finally pivoting the bale receiving table without the bale back to its home position at least partially vertically beneath the loadbed.

* * * * *